(12) United States Patent
Marcus et al.

(10) Patent No.: US 6,755,655 B2
(45) Date of Patent: Jun. 29, 2004

(54) ELECTRONIC EDUCATIONAL TOY APPLIANCE AND A PORTABLE MEMORY DEVICE THEREFOR

(75) Inventors: Brian I. Marcus, San Francisco, CA (US); Warren S. Heit, San Francisco, CA (US)

(73) Assignee: Tinkers & Chance, San Francisco, CA (US)

(*) Notice: Subject to any disclaimer, the term of this patent is extended or adjusted under 35 U.S.C. 154(b) by 0 days.

(21) Appl. No.: 10/260,903

(22) Filed: Sep. 30, 2002

(65) Prior Publication Data

US 2003/0031988 A1 Feb. 13, 2003

Related U.S. Application Data (63) Continuation of application No. 09/127,111, filed on Jul. 31, 1998, now Pat. No. 6,464,503, which is a continuation of application No. 08/890,294, filed on Jul. 9, 1997, now Pat. No. 5,823,782, which is a continuation of application No. 08/581,437, filed on Dec. 29, 1995, now abandoned.

(51) Int. Cl.[7] ........................ G09B 19/00; G09B 19/02; G09B 5/00; G09B 7/00
(52) U.S. Cl. ...................... 434/156; 434/116; 434/159; 434/169; 434/172; 434/178; 434/185; 434/188; 434/191; 434/193; 434/201; 434/208; 434/209; 434/308; 434/309; 434/311; 434/321; 434/322; 434/335; 434/340; 434/362
(58) Field of Search ................................ 434/116, 118, 434/156, 159, 167, 169, 172, 178, 185, 188, 190, 191, 193, 201, 208, 209, 308, 309, 311, 321, 322, 335, 340, 351, 358, 362

(56) References Cited

U.S. PATENT DOCUMENTS

| 889,515 | A | 6/1908 | Foley |
|---|---|---|---|
| 3,052,041 | A | 9/1962 | Luxton et al. |
| 3,314,165 | A | 4/1967 | Shreck et al. |
| 3,654,706 | A | 4/1972 | Perrella |
| 3,665,618 | A | 5/1972 | Hahn |
| 3,795,063 | A | 3/1974 | Nelson |
| 3,798,792 | A | 3/1974 | Askew |
| 3,920,124 | A | 11/1975 | Patterson |

(List continued on next page.)

FOREIGN PATENT DOCUMENTS

| DE | 3813779 | | 11/1989 |
|---|---|---|---|
| DE | 4207534 | A1 | 9/1993 |
| EP | 0310766 | A1 | 4/1989 |
| EP | 606790 | | 7/1994 |
| FR | 2607400 | | 6/1988 |
| GB | 2103943 | | 3/1983 |
| GB | 2237514 | | 5/1991 |
| GB | 2237514 | A | 7/1991 |
| JP | 354062033 | A | 5/1979 |
| JP | 405177056 | A | 7/1993 |
| SU | 878324 | | 2/1980 |
| WO | WO 9603188 | A1 | 2/1996 |
| WO | WO 01/08772 | * | 2/2001 |

OTHER PUBLICATIONS

US 5,009,603, 4/1991, Fong et al. (withdrawn)
Fitzmaurice et al., "Bricks: Laying the Foundations for Graspable User Interfaces".
Fitzmaurice, "Graspable User Interfaces", 1996.

Primary Examiner—John Edmund Rovnak (57) ABSTRACT

An electronic toy appliance for use with interchangeable graspable objects such as blocks or tiles, the toy appliance designed to stimulate the development of a child's mind using audio feedback.

34 Claims, 9 Drawing Sheets

U.S. PATENT DOCUMENTS

| | | | |
|---|---|---|---|
| 4,023,807 A | 5/1977 | Santianni | |
| 4,028,537 A | 6/1977 | Snow | |
| 4,176,470 A | 12/1979 | Fosner et al. | |
| 4,287,568 A | 9/1981 | Lester | |
| 4,341,385 A | 7/1982 | Doyle et al. | |
| 4,391,447 A | 7/1983 | Dudley | |
| 4,550,250 A | 10/1985 | Mueller et al. | |
| 4,836,075 A | 6/1989 | Armstrong | |
| 4,936,185 A | 6/1990 | Yamaguchi et al. | |
| 4,968,255 A | 11/1990 | Lee et al. | |
| 5,013,047 A | 5/1991 | Schwab | |
| 5,019,714 A | 5/1991 | Knowles | |
| 5,023,408 A | 6/1991 | Murakami et al. | |
| RE33,662 E | 8/1991 | Blair et al. | |
| 5,050,883 A * | 9/1991 | Goldfarb et al. | 463/15 |
| 5,082,286 A | 1/1992 | Ryan et al. | |
| 5,088,928 A | 2/1992 | Chan | |
| 5,129,654 A | 7/1992 | Bogner | |
| 5,134,388 A | 7/1992 | Murakami | |
| 5,188,368 A | 2/1993 | Ryan | |
| 5,188,533 A | 2/1993 | Wood | |
| 5,190,285 A | 3/1993 | Levy et al. | |
| 5,252,814 A | 10/1993 | Tooley | |
| 5,275,567 A | 1/1994 | Whitfield | |
| 5,298,731 A | 3/1994 | Ett | |
| 5,302,132 A | 4/1994 | Corder | |
| 5,330,380 A | 7/1994 | McDarren et al. | |
| 5,349,129 A | 9/1994 | Wisniewski et al. | |
| 5,402,151 A | 3/1995 | Duwaer | |
| 5,435,573 A | 7/1995 | Oakford | |
| 5,451,178 A | 9/1995 | Yorozu et al. | |
| 5,481,265 A | 1/1996 | Russell | |
| 5,511,980 A | 4/1996 | Wood | |
| 5,540,301 A | 7/1996 | Dumont | |
| 5,618,182 A | 4/1997 | Thomas | |
| 5,651,548 A | 7/1997 | French et al. | |
| 5,731,801 A | 3/1998 | Fukuzaki | |
| 5,739,814 A * | 4/1998 | Ohara et al. | 345/173 |
| 5,823,782 A | 10/1998 | Marcus et al. | |
| 5,855,483 A | 1/1999 | Collins et al. | |
| 5,991,693 A | 11/1999 | Zalewski | |
| 6,052,117 A | 4/2000 | Ohara et al. | |
| 6,464,503 B1 | 10/2002 | Heit | |

* cited by examiner

ELECTRONIC EDUCATIONAL TOY APPLIANCE AND A PORTABLE MEMORY DEVICE THEREFOR

The present application is a continuation of U.S. patent application Ser. No. 09/127,111, filed Jul. 31, 1998 and issued as U.S. Pat. No. 6,464,503;

which is a continuation of U.S. patent application Ser. No. 08/890,294, filed Jul. 9, 1997 and issued as U.S. Pat. No. 5,823,782;

which is a continuation of U.S. patent application Ser. No. 08/581,437, filed Dec. 29, 1995, now abandoned.

BACKGROUND OF THE INVENTION

1. Field of the Invention

The present invention relates to an educational system for teaching children language and/or arithmetic, and in particular to a system where a child arranges one or more computer-recognizable characters on a working platform to spell words or provide a mathematical result in response to computer generated questions or prompts, the system then indicating whether the words or mathematical result is correct.

2. Description of the Related Art

As computers continue to grow faster and smarter and smaller, they have become omnipresent, reaching people of all shapes and sizes. Nevertheless, there remains one unchanging constant: in order for the computer to provide the information or operate as desired, some type of data must be provided to the computer. From punchcards in the late 60's and 70's to teletypes of the 70's and 80's to CRTs of the 80's and to mouses and keyboards of today, there always remains a way for the user to enter data into the computer.

There has been one segment of the population that has largely been excluded from the computer revolution, the young child. This is true primarily for two reasons. First, young children have not yet developed the metal capabilities or the motor skills to interact well with conventional computers, which require data to be entered, for example via the key board or mouse, in a fixed format. Secondly, young children are interested and entertained by simple sensory input, and the vast resources offered by conventional computers are generally too advanced to be of interest to them.

One simple sensory input of great interest to children is the sense of touch. It is why young children are commonly more interested in the box or wrapping of a gift than the actual gift contained therein. Several games have been developed which indulge a child's sense of touch, such as for example those including building blocks. Some such tactile systems also include letters in an attempt to educate a child while they are using the blocks. However, such tactile systems are ineffective without adult instruction as to what the letters represent. Moreover, the inventors of the present invention are unaware of any such tactile systems that work in combination with the vast resources provided by a computer.

SUMMARY OF THE INVENTION

It is therefore an object of the present invention to provide an easy to use, safe and fun computer data entry device for children.

It is a further object of the present invention to make learning enjoyable for children by providing an educational system including tactile blocks that may be handled by a child indulges a child's enjoyment of.

It is another object of the present invention to combine a tactile educational system with the vast resources provided by a computer.

It is a further object of the present invention to provide a system for educating children, which may be used by a child without the aid or presence of an adult, and which may be used by a child at his or her own pace.

These and other objects are accomplished by the present invention, which takes advantage of the fact that children enjoy the tactile feel of small hand-held blocks in combination with a system to teach them language and/or arithmetic. According to the invention, a working platform has a surface for receiving a plurality of blocks, which blocks include characters on one or more surfaces thereof. When a block is placed on the working platform, the platform is capable of recognizing the location of the block, and the identification of the block.

The blocks are designed to look and feel like the spelling blocks that are typically found on the market today—i.e., they may be made of wood or plastic and easily fit into young child's hand; they have big, bright letters or pictures or symbols etched or displayed in a variety of colors on one or more of the surfaces of the blocks.

Preferably, each block includes directly beneath the surface an identification device for each character on the block that is capable of transmitting a signal uniquely representative of the character. When a particular block is placed on the working platform in a particular location, a sensor associated with that location detects the identification of the block.

The working platform includes a data processing device such as a computer, and digital circuitry that receives as an input the location and the identification of the detected block. The digital circuitry converts this information into a computer usable form and sends it via a data line into the computer.

BRIEF DESCRIPTION OF THE DRAWINGS

The invention will now be described with reference to the drawings in which.

DETAILED DESCRIPTION

The present invention will now be described with reference to FIGS. 1–9 which in general relate to, an education system for teaching children or other individuals language and/or arithmetic. In a preferred embodiment, the system would be utilized by children to spell words and/or to indicate a mathematical result. However, it is understood that the present invention may be utilized by any individual to provide one or more computer-recognizable characters in a desired sequence, generally in response to computer generated questions or prompts.

Figure 1:
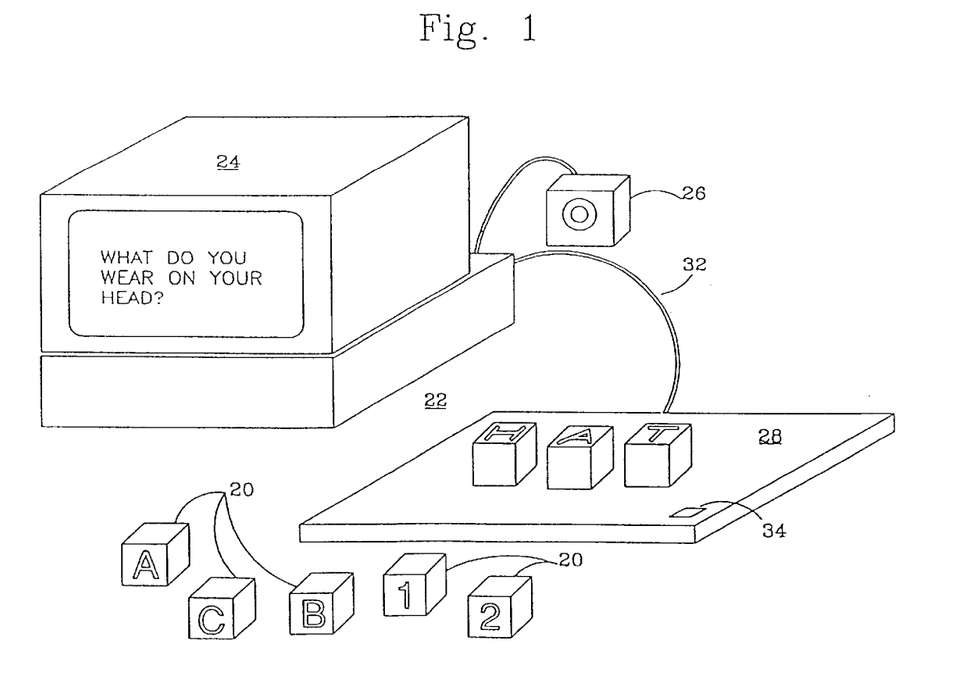
FIG. 1 is an isometric representation of the educational system according to the present invention.

Referring now to FIG. 1, the present invention preferably includes a plurality of blocks 20, each containing an alphanumeric character on a surface thereof. The alphanumeric characters may include letters, numbers and/or punctuation marks. In an alternative embodiment of the invention, it is contemplated that the blocks 20 include pictures or symbols such as the sun, moon, animals, etc., in addition to or instead of the alphanumeric characters. In a further embodiment of the present invention, the blocks may include characters made up of raised dots that form braille letters, numbers and other braille characters.

A character on a surface of a block 20 may be defined by being a different color than the rest of the block surface surrounding the character. The character may additionally be raised or lowered relative to the block surface containing the character. In the embodiment of the invention including braille characters, the characters would of course be at a different elevation relative to the block surface surrounding the characters.

The blocks 20 are preferably formed of durable and wear-resistant material capable of withstanding substantial shock due to throwing of the block or other similar impacts. Moreover, the blocks are preferably formed of a non-toxic material to avoid injury in the event a child attempts to put the block in his or her mouth. A preferred material is any of several high strength polycarbonates. However, several other materials may be used, such as for example wood and metal. Preferably, the material should allow character-recognition components, certain embodiments of which described hereinafter, to be included with the blocks 20 during block fabrication. Moreover, to make the blocks suitable for use by children, the blocks should be large enough not to fit entirely within a child's mouth, should have all edges rounded, and should be light weight to prevent injury if thrown. It is understood that the above-described characteristics of the blocks that make them suitable for use by children may be omitted in alternative embodiments of the present invention.

The blocks are used in conjunction with a processing device 22, which may include in part a conventional computer. As shown in the isometric view of FIG. 1 and the schematic representation shown in FIG. 3, the processing device 22 preferably includes a conventional data storage device 23 for storing data, a conventional monitor 24 for visual display, a conventional speaker 26 for audio playback, a working platform 28 for supporting the blocks 20 and for generating character-identification and block information, and a conventional central processing unit ("CPU") 30 capable of executing software instructions, and capable of communicating with the data storage device 23, the monitor 24, the speaker 26, and the working platform 28. It is understood that one or the other of the monitor 24 and speaker 26 may be omitted in alternative embodiments of the present invention. It is also understood that the data storage device 23 may be omitted in alternative embodiments of the invention.

Figure 2:
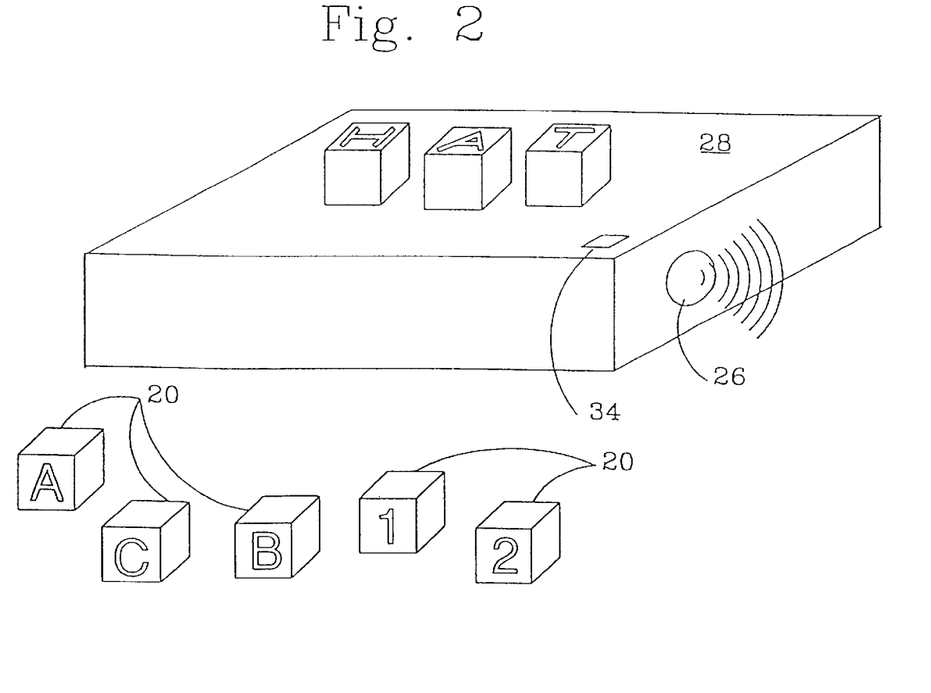
FIG. 2 is an isometric representation of an alternative embodiment of the educational system according to the present invention.
Figure 3:
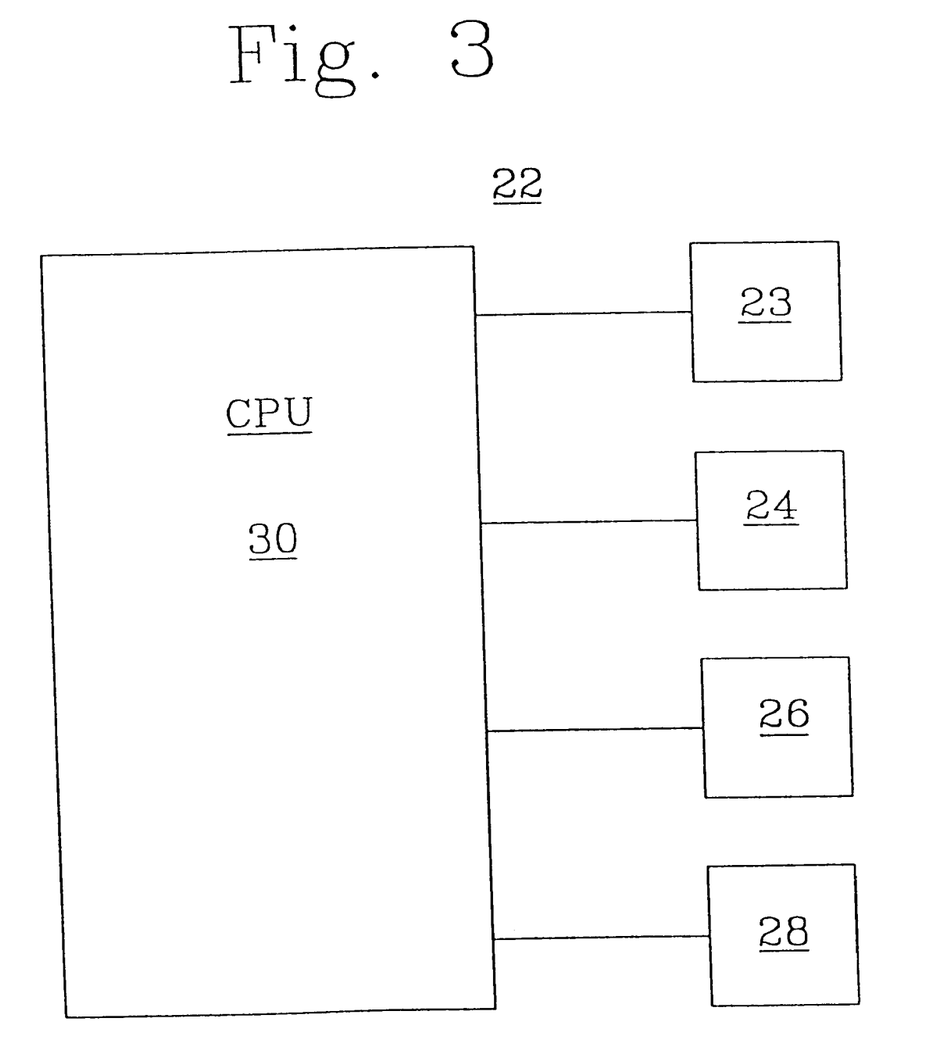
FIG. 3 is a schematic representation of the processing device according to the present invention.

Moreover, as shown in the alternative embodiment of FIG. 2, the processing device 22 may be contained within a unitary enclosure, the upper surface of which forms the working platform 28. In the embodiment shown in FIG. 2, the CPU 30, the data storage device 23, and the speaker 26 may be included within the enclosure.

Once a block is located on the working platform, the platform generates a signal for use by an application program running on the processing device 22 as explained hereinafter. The generation processes in the working platform are controlled by a microprocessor 55 (FIG. 9) in the working platform. As described in greater detail below, the microprocessor 55 scans the working platform for placement of one or more blocks thereon. Upon detection of the placement of a block on the working platform, the microprocessor 55 encodes the location and identification information into an encoded binary message. The message is then sent preferably over a dedicated line 32 to the processing device 22.

Figure 9:
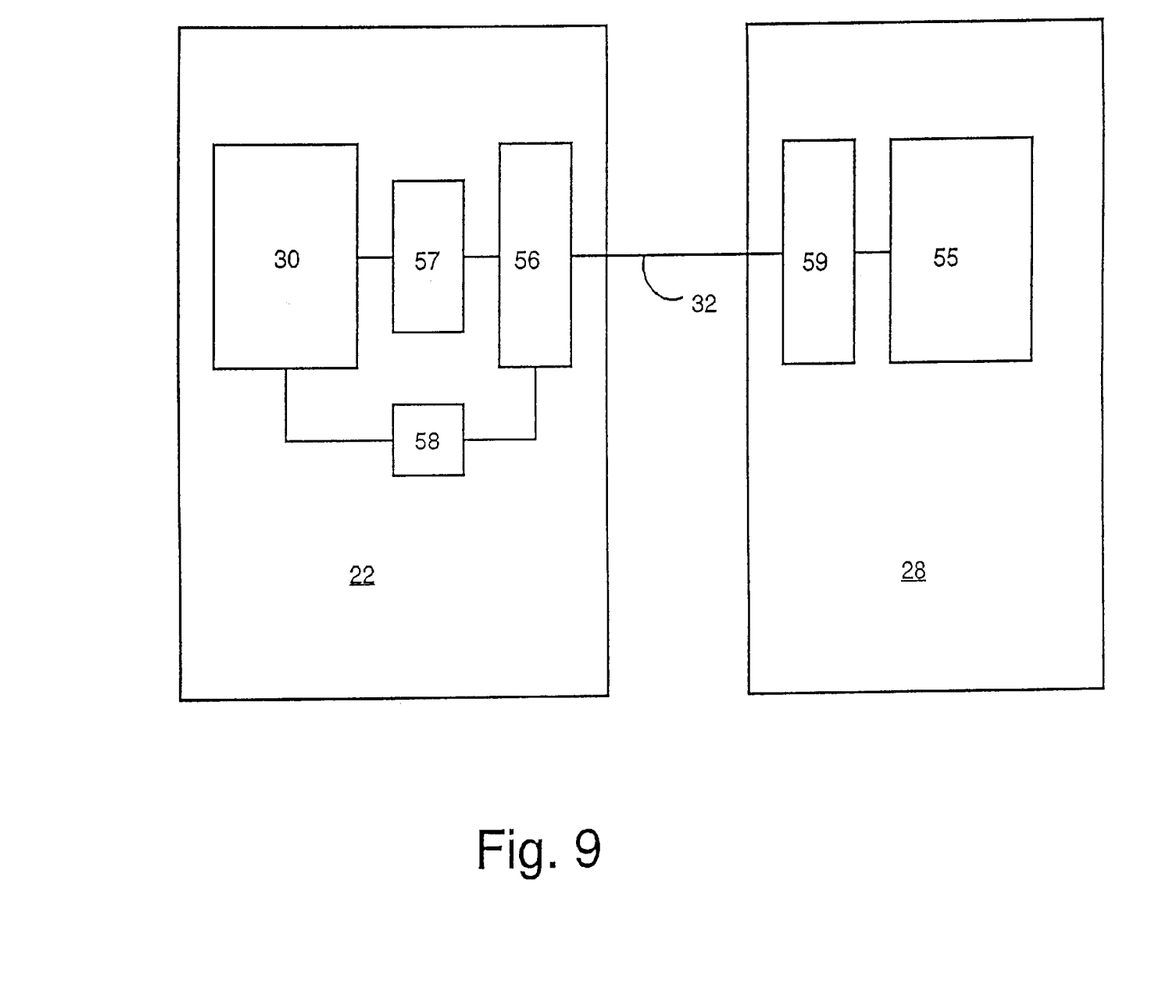
FIG. 9 is a schematic of a working platform controller according to an embodiment of the invention.

The line 32 is preferably bi-directional so the processing device 22 can send commands or other information to the working platform. For example, in the embodiments described below in which the working platform comprises a touch-sensitive display screen (preferably, flat panel), the bi-directional line allows the processing device 22 to display images on the flat panel screen to facilitate interaction between the application software and user thereof.

In an alternative embodiment, line 32 my be omitted and replaced by a wireless digital communication link between the processing device 22 and working platform 28. Advantageously, according to this embodiment, the working platform may be used a greater distance from the processing device 22 without concern over extension wires.

Figure 4:
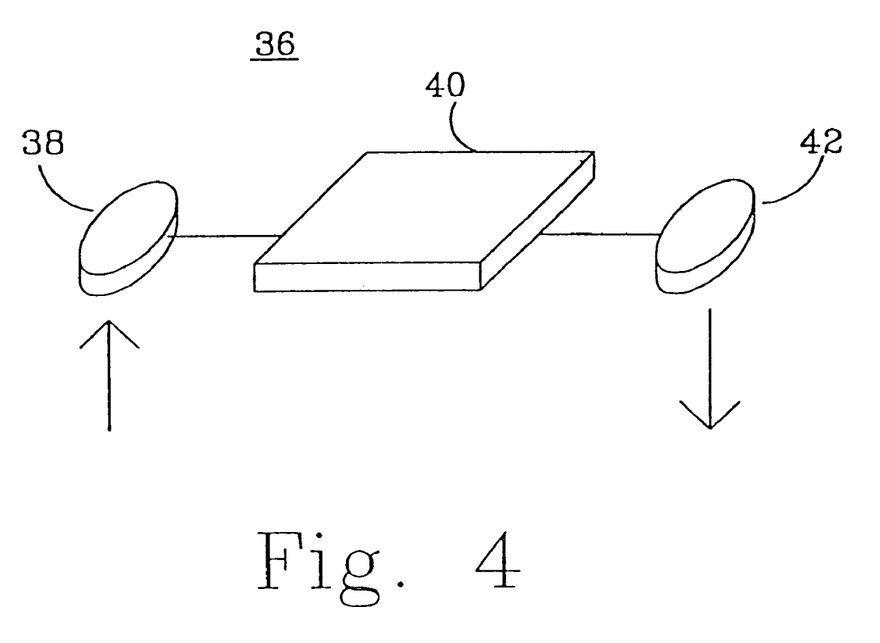
FIG. 4 is a schematic representation of the character identification transmission system according to the present invention.
Figure 5:
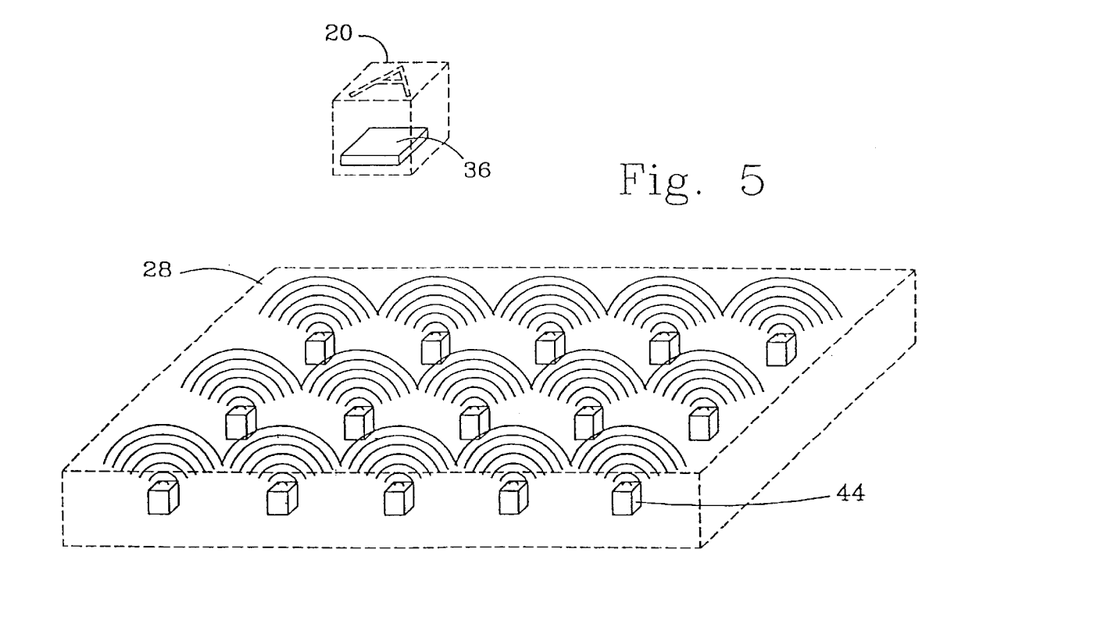
FIG. 5 is an isometric view of the character identification and block location systems within the character blocks and working platform according to the present invention.

Referring now to FIGS. 1 and 4–5, each block 20 is capable of outputting a character identification signal that uniquely represents the character indicated on the upper surface of the block. The working platform 28 serves to support the blocks 20, to generate character identification information for a block based on the character identification signal output from that block, and also to generate location information indicating the location of a block 20 relative to each other block 20 on the working platform. The working platform forwards the block location information and the character identification information to the processing device 22 via the line 32 coupling the working platform 28 with the CPU 30. The working platform 28 further includes a button 34 which initiates the generation of the block location information and character identification information by the working platform, and also triggers the transfer of the information to the processing device 22. (In an alternative embodiment, in operation the block location information and the character identification information are continuously generated and transmitted to the processing device 22.) It is understood that structures other than button 34 may be used in alternative embodiments, such as for example a conventional mouse.

In operation, when a user of the system according to the present invention is finished arranging the blocks 20 on the platform 28, the user depresses button 34, and the generation and transfer of information is initiated. In a preferred embodiment, the block location information and character identification information may converted to a digital signal, which may be transmitted over the line 32 to the CPU 30. The block location and character identification information may be stored and transferred as a multiple bit word, containing both block location information and character identification information. It is understood that the number of bits used to transmit the digital signal may vary in alternative embodiments of the present invention.

The character identification information and the block location information may be generated by any of several known technologies. As shown in FIGS. 4 and 5, each block 20 preferably includes a transmission system 36 mounted within the block proximate to a surface of the block opposed to the surface including the character. Known transmission systems are sufficiently small so as to allow one or more such systems to be provided within the block. In one embodiment of the present invention, the transmission system includes a receiver 38, a microprocessing chip 40, and a transmitter 42. The microprocessing chip 40 is powered by an energizing signal, in the form of an electromagnetic wave received from the working platform 28, as explained in greater detail below. Receipt of the energizing signal allows the transmission system to operate without an on-board power source. The energizing signal is received in the chip 40 via the receiver 38. Once energized, the chip emits the character identification signal including encoded information uniquely representative of the character on the block. The character information signal is forwarded by the transmitter 42 to the working platform 28, where the signal is converted to a digital signal via an analog-to-digital converter (not shown). Systems such as transmission system 36 are commercially available from Sensor Engineering Co., Hamden, Conn. 06517.

It is understood that other known technologies may be utilized to communicate the identity of the character on a block 20 to the working platform 28. For example, block 20 may include a transmission system 36 comprised of magnetically encoded data uniquely representative of the character on the block. The magnetically encoded data may be read by one or more sensors such as transducers provided within the working platform. In a further embodiment of the present invention, each block having a different character may have a different weight, which weight is sensed by the working platform to identify the character. It is further contemplated that the working platform and the surface of the block supported adjacent thereto may be transparent so that the transmission system may be any of various optical systems. It is understood that various other known technologies may be used to generate the character identification signal within working platform 28.

The blocks 20 may include between one and six characters on its respective surfaces. In a preferred embodiment a block 20 will include a transmission system within the block for each of the characters on the surfaces of the block. Thus, for example, in an embodiment where a block 20 includes six characters, the block will includes six different transmission systems, with each character/transmission system pair provided proximate to opposed surfaces from each other. It is understood that a block may include less transmission systems than there are characters on the block. In such an embodiment, the transmission system will transmit a particular character identification depending on the orientation of the block 20 on the working platform, i.e., depending on which character was showing on the top surface of the block.

It is necessary to identify not only the character information, but also the location of a block on the working platform relative to other blocks so as to allow identification of whole words, phrases and/or mathematical results. Therefore, the working platform includes one of various known block location systems. In the embodiment shown in FIG. 5, working platform 28 includes a grid of readers 44. The grid of readers are intended to operate with the transmission system described above including receiver 38, microprocessing chip 40, and transmitter 42. Each reader emits the energizing signal described above to energize the microprocessor chip 40 of a block 20. The microprocessor chip then emits the character identification signal back to the reader via the transmitter 42, whereupon the signal is converted to a digital signal as explained above. Readers such as readers 44 are commercially available from Sensor Engineering Co., Hamden, Conn. 06517.

The readers 44 and transmission system 36 are configured such that a particular reader 44 will only receive a character identification signal from a block 20 if that block 20 is located proximately thereto. In one embodiment of the invention, a reader will only receive a character identification signal from a block located 2 to 4 inches away. With such a system, it is possible that more than one reader 44 will detect a particular block. However, based on the number of readers within the working platform and the distance range over which a reader will detect a particular block, the microprocessor 55 is able to determine the location of the detected block 20 on the working platform. By identifying which reader receives a particular character identification signal, a block location signal associated with that character identification signal may also be generated.

Figure 6:
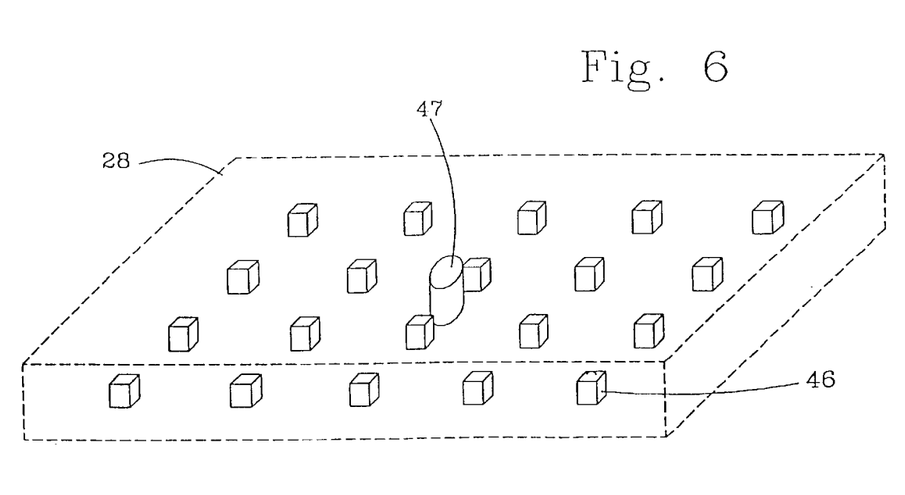
FIG. 6 is an isometric view of the block location system within the working platform according to an alternative embodiment of the present invention.

It is understood that other known technologies may be utilized to generate the block location signal. For example, as shown in FIG. 6, a grid may be set up as described above, but comprised of a plurality of emitters 46 for emitting the energizing signal. The system may further comprise a single reader 47 for receiving a character identification signal. In order to generate the block location information signal, the microprocessor 55 may control the emitters 46 to fire the energizing signal one emitter at a time. Thus, breaking the emitter grid into a Cartesian plane of x,y coordinates, the emitter at 1,1 fires the energizing signal at a time $t_1$. If there is a block 20 located thereabove, its chip is energized and a character identification signal is transmitted to the reader 47. Each emitter 46 fires the energizing signal at a different time. The time t at which each emitter fires its energizing signal is known. Thus, by identifying the time at which a character identification signal is received in the reader 47, the emitter 46 which caused the generation of the character identification signal may be determined, and the block location signal may thus be generated.

In a further embodiment of the present invention, the block location system within the working platform may comprise a single reader, such as for example one of the readers 44 shown in FIG. 5, capable of both transmitting an energizing signal and receiving a character identification signal. In this embodiment, the reader is mounted for translation so that the reader is moved across the entire surface of the working platform. When a character identification signal is sensed by the reader, the position of the reader is noted, and the block location signal associated with the sensed character identification signal is generated.

Grids of various other known configurations may be utilized in the block location system in alternative embodiments of the invention. For example, a grid of wires may be provided within the working platform, together with a single reader as described above capable of both transmitting an energizing signal and receiving a character identification signal. In this embodiment, in addition to transmitting the character identification signal, each block also emits a magnetic field. Thus, when a block 20 is placed on the working platform, a character identification signal is generated. The magnetic field of that block also generates a current in one or more of the wires of the grid, from which the location of the block may be determined. Alternatively, the grid of wires may be energized sequentially much in the same way as described in connection with FIG. 6 to induce a magnetic field to facilitated detection of the location and identification of the blocks.

Figure 7:
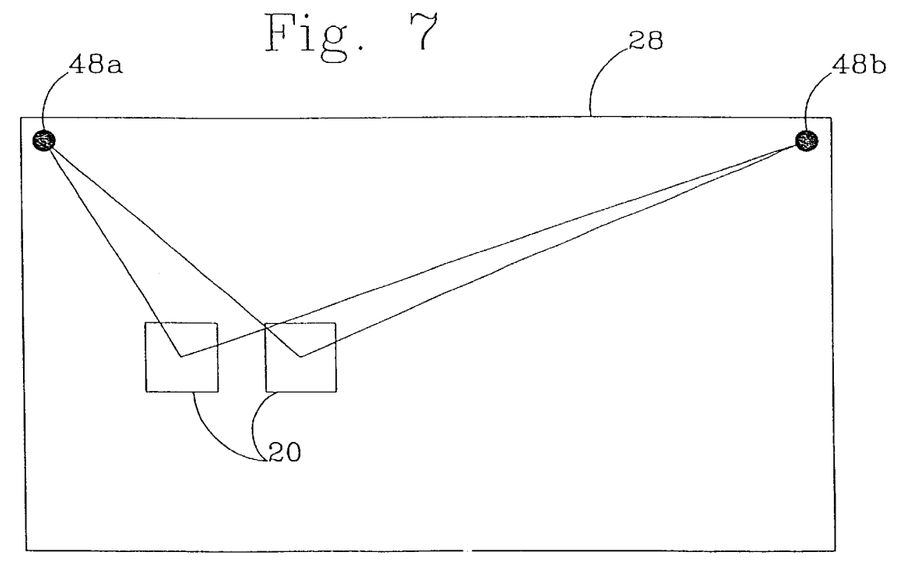
FIG. 7 is a top view of the block location system within the working platform according to an alternative embodiment of the present invention.
Figure 8:
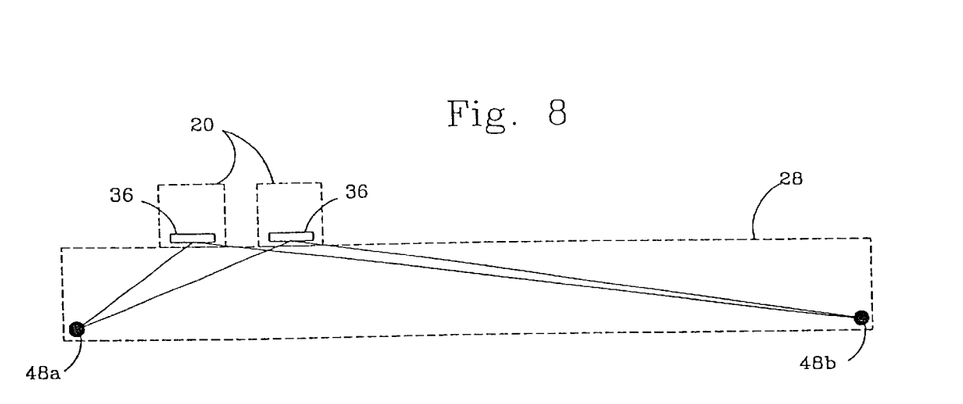
FIG. 8 is a cross-sectional view of the embodiment of the invention shown in FIG. 7.

A further embodiment of the present invention is shown in FIGS. 7 and 8, where the position of each block 20 on the working platform may be determined by a pair of sensors 48a and 48b. The sensors 48a, 48b are preferably provided at the upper corners of the working platform. However, the sensors 48a, 48b may alternatively be located at the lower corners, at the left or right corners, or spaced from each other along a side of the working platform. When a reader 44 or an emitter 46 sends an energizing signal to energize a chip 40 as described above, the chip in this embodiment generates both a character identification signal and a proximity signal. The proximity signal is transmitted to both of the sensors 48a and 48b. Once a proximity signal is received in the sensors 48a and 48b, the signal may be used to determine the distance between the chip 40 and the sensors 48a, 48b, respectively, by known technology. Such technologies include surface wave acoustics, measurement of the EM field emanating from the chip, or measurement of the time it takes for the signal to reach the sensors 48a, and 48b. Once the distance between a block 20 and the sensors 48a and 48b, respectively, is determined, the precise location of the block 20 on the working platform 28 may be calculated by triangulation. It is understood that in an embodiment of the invention, the character identification signal may also act as the proximity signal.

As shown in the cross-sectional view of FIG. 7, the sensors 48a, 48b are preferably located in a lower portion of the working platform 28 so that the proximity signal of a first block does not interfere with a proximity signal of a second block located between the first block and the sensors 48a, 48b.

It is understood that other known technologies for generating the character identification and block location information may be used in alternative embodiments of the invention. For example, a further embodiment of the invention incorporating many of the features previously described to identify the location and identification of the placement of a block on the working platform includes the use of a platform that is able to detect the image of the impression of the block on the platform, hereinafter referred to as image-sensitive platforms. Examples of image-sensitive platforms include touch-sensitive surfaces, such as those frequently used in many automated teller machines, or optically-sensitive screens, such as a screen employing one or more arrays of imaging mechanisms, such as charge-coupled devices.

In this embodiment, the placement of a particular block on the image-sensitive platform creates a unique impression on the image-sensitive screen. The location of this impression is also detectable by the microprocessor 55. For example, in touch-sensitive displays, the controller is able to identify the location of the impression by identifying the pixel or pixels associated with the impressions of the block on the platform. Similarly, in optically-sensitive screens, the controller is able to identify the location of the impression by identifying the array of charge-coupled devices detecting the impression of the block on the platform. The identification of this impression is also detectable by the microprocessor 55. By known imaging techniques, the controller can compare the detected impression information with a plurality of images stored in memory to recognize the identification of the block.

In an alternative embodiment of the invention, the working platform may have a fixed number of discrete locations into which blocks may only be placed. This is preferably accomplished by providing a fixed number of indentations approximately the size of the block on the surface of the working platform. Typically, the indentations may be a quarter of an inch deep. The indentations may be arranged either in a single row or column or in a multi-dimensional array. According to this embodiment, there would exist only a fixed number of locations on the working platform in which a block may be located. There are advantages associated with this embodiment. Because there are only a fixed number of locations on the working platform in which a block may be placed, the generation of block location and identification information is simplified. In this embodiment, it is possible to have only one reader or sensor associated with each discrete location. The possibility that more than one reader or sensor will detect more than one particular block is greatly reduced or eliminated.

In operation, when, a block is placed on the working platform and the microprocessor 55 has recognized its location and identification, a series of actions are set into motion. The microprocessor 55 encodes the location and identification information into an binary message compatible with protocols of today's personal computers. An example of such a protocol is set forth in Frank Van Gilluwe, *The PC Undocumented, A Programmer's Guide to I/O, CPUs, and Fixed Memory Areas.* As shown on FIG. 9, the microprocessor 55 sends an encoded message over line 32. The line 32 is connected to the processing device 22 via any of the processing device's many input/output connectors (e.g., mouse connector, keyboard connector or the parallel or serial ports) A controller 56 in the processing device 22 receives the encoded message. The controller 56 translates the encoded message into a system value and places the value into a buffer 57. The controller 56 then issues an interrupt request via interrupt control 58 indicating that data is available in output buffer 57. The operating system of the processing device 22 or application program running thereon uses an interrupt to access the buffer 57 via CPU 30. Various interrupt functions are used to find and retrieve block information and to determine the block information in the buffer 57.

The controller 56 in the processing device 22 communicates with the working platform over line 32. A synchronized clock line is provided from the controller 56 to the working platform via microprocessor 55 when data are sent from the working platform. Preferably, information over line 32 is sent in an 11-bit serial frame consisting of a start bit, 8 data bits, an odd parity bit and a stop bit. It is understood that different length frames and different configurations of the frames consistent with the processing device 22 are contemplated by the present invention. Internal to the working platform is a first-in-first-out buffer 59. Preferably, this buffer 59 holds up to 20 bytes of information although a platform buffer of smaller or great size is contemplated within the present invention.

In the idle state, both the data and clock lines are high. To begin sending the data to the processing device 22, the working platform sends the start bit on the line 32. The controller 56 responds by starting the clock line, with the first clock pulse going low. The clock is continued, with the working platform sending each bit in turn. At the 11th clock, the working platform sends the stop bit, and the clock line resumes its idle state.

Depending on the configuration of the working platform, the data sent from the working platform to the controller 56 normally includes one or more of the following: block identification information, block location information, and/ or commands. A placement of a block on the working platform may result in the transmission of identification information alone, location information alone, or both identification and location information to the keyboard controller. While a block is moved on the working platform, the working platform transmits the identification of the moved block and the new locations of the block on the working platform. When a block is removed from the working platform, the working platform will transmit a removal code along with identification of the block removed.

In operation, the, above-described hardware is preferably used with software applications which, in general, prompt a child to arrange the blocks 20 in a particular configuration on the working platform 28. The prompt can be, for example, a question that either appears visually on the monitor 24 or is played over the speaker 26. Once the child has arranged the blocks 20 in what he or she believes to be the correct response to the question, the button 34 is depressed, the microprocessor 55 generates the character identification and block location information, and the result is sent to the CPU 30 (it is understood that the microprocessor 55 may continuously generates character identification and block location information as blocks are set down and lifted from the working platform). The CPU 30 then indicates to the child whether or not that response is correct. If the response is incorrect, the software can prompt the child to try again.

It is understood that the software may be written to ask a wide variety of questions, appropriate for children of various ages and educational levels. For example, the child may be prompted to spell a series of words, either audibly over the speaker, or by showing a picture of the object to be spelled on the monitor. In one embodiment, the software program may branch to more difficult or simple questions, depending on the number of correct previous answers. In a further embodiment intended for children first learning the alphabet, the child may randomly place a block on the working platform, and the software then audibly indicates the sound of the letter, and shows a number of words including that letter.

The applications software may be stored within the system on the data storage device 23, loaded onto the system from a from a floppy drive, or received into the system from a remote location over data transmission lines.

It is understood that the software and/or hardware according to the present invention may be provided for operation by individuals other than children. For example, as indicated above, the characters on the surfaces of the blocks 20 may be braille characters to teach individuals the braille language.

In a further embodiment, the blocks 20 may comprise tiles having letters and numbers thereon such as those on the tiles of the board game Scrabble®. In this embodiment, the processing device 22 may be configured to read words formed both vertically and horizontally, and the software may include an encoded dictionary in memory. Thus, the present invention may operate as an electronic Scrabble® game, where letter sequences are formed on the board, and the processing device 22 indicates whether the letter sequences in fact form words found in the stored dictionary.

Although the invention has been described in detail herein, it should be understood that the invention is not limited to the embodiments herein disclosed. Various changes, substitutions and modifications may be made thereto by those skilled in the art without departing from the spirit or scope of the invention as described and defined by the appended claims.

We claim:

1. An electronic toy appliance for use with cube-shaped blocks, the toy appliance designed to stimulate the development of a child's mind using audio feedback comprising:
    a base having an upper surface, the upper surface of the base having a substantially horizontal area with a plurality of block receiving recesses, each of the block receiving recesses adapted to receive a lower portion of a cube-shaped block and further adapted to allow a child to change the orientation of the block so different faces of the block may face upwardly;
    one or more sensors, the one or more sensors capable of sensing information associated with a block in a block receiving recess;
    a speaker; and
    a processor capable of receiving an input corresponding to the block information sensed by the one or more sensors and capable of generating, depending at least in part on the received input, an audio output via the speaker designed to stimulate the development of a child's mind.

2. An electronic toy appliance as in claim 1, wherein the blocks have a different symbol on a plurality of its faces.

3. An electronic toy appliance as in claim 2, wherein the symbols are non-alphanumeric symbols.

4. An electronic toy appliance as in claim 2, wherein the symbols are alphanumeric symbols.

5. An electronic toy appliance as in claim 1, wherein the base further includes a button that upon actuation initiates sensing of information from one or more blocks.

6. An electronic toy appliance as in claim 1, wherein the plurality of block receiving recesses are arranged in a multi-dimensional fashion.

7. An electronic toy appliance as in claim 1, wherein the processor generates a first audio output through the speaker when a first set of the blocks are in the block receiving recesses and the processor generates a second audio output through the speaker different from the first audio output when a second set of the blocks, different from the first set in at least one respect, are in the block receiving recesses.

8. An electronic toy appliance as in claim 1, wherein the processor generates a first audio output through the speaker when a first set of block are in the black receiving recess and the processor generates a second audio output through the speaker different from the first audio output when a different orientation of the first set of block in at least one respect are in the block receiving recess.

9. An electronic toy appliance as in claim 1, wherein the processor is capable of generating an audio output via the speaker to prompt a child to change the orientation of a block so a different face of the block faces upwardly.

10. An electronic toy appliance for use with cube-shaped blocks, the toy appliance designed to stimulate the development of a child's mind using audio feedback comprising:
    a base having an upper surface with a plurality of block receiving recesses, each of the block receiving recesses adapted to receive a cube-shaped block having six faces and further adapted to allow a child to change the orientation of the block so different faces of the block may face upwardly;
    one or more sensors, the one or more sensors capable of sensing information associated with a block in a block receiving recess;
    a speaker;
    a portable memory data receiving device capable of receiving data from a portable memory element, the data including information to provide a child with audio feedback responsive to the child's play with the cube-shaped blocks on the toy appliance; and a processor capable of receiving an input corresponding to the block information sensed by the one or more sensors and capable of generating, depending at least in part on the received input, an audio output via the speaker designed to stimulate the development of a child's mind, wherein the processor utilizes data from the portable memory element to generate the output.

11. An electronic toy appliance as in claim 10, wherein the blocks have a different symbol on a plurality of its faces.

12. An electronic toy appliance as in claim 10, wherein the symbols are non-alphanumeric symbols.

13. An electronic toy appliance as in claim 10, wherein the symbols are alphanumeric symbols.

14. An electronic toy appliance as in claim 10, wherein the base further includes a button that upon actuation initiates sensing of information from one or more blocks.

15. An electronic toy appliance as in claim 10, wherein the plurality of block receiving recesses are arranged in a multi-dimensional fashion.

16. An electronic toy appliance as in claim 10, wherein the processor generates a first audio output through the speaker when a first set of the blocks are in the block receiving recesses and the processor generates a second audio output through the speaker different from the first audio output when a second set of the blocks, different from the first set in at least one respect, are in the block receiving recesses.

17. An electronic toy appliance as in claim 10, wherein the processor generates a first audio output through the speaker when a first set of block are in the block receiving recess and the processor generates a second audio output through the speaker different from the first audio output when a different orientation of the first set of blocks in at least one respect are in the block receiving recess.

18. An electronic toy appliance as in claim 10, wherein the processor is capable of generating an audio output via the speaker to prompt a child to select a block for placement in a block receiving recess.

19. An electronic toy appliance as in claim 10, wherein the processor is capable of generating an audio output via the speaker to prompt a child to change the orientation of a block so a different face of the block faces upwardly.

20. An electronic toy appliance for use with cube-shaped blocks, the toy appliance designed to stimulate the development of a child's mind using audio feedback comprising:

a plurality of cube-shaped blocks having at least six faces, the blocks containing one or more circuits with information corresponding to the identity of the face of the block facing upwardly;

a base having an upper surface with a plurality of block receiving recesses, each of the block receiving recesses adapted to receive a cube-shaped block having six faces and further adapted to allow a child to change the orientation of the block so different faces of the block may face upwardly;

one or more sensors capable of sensing information from the one or more circuits contained in the object in a block receiving recess;

a speaker; and a processor capable of receiving an input corresponding to the block information sensed by the one or more sensors and capable of generating, depending at least in part on the received input, an audio output via the speaker designed to stimulate the development of a child's mind.

21. An electronic toy appliance as in claim 20, wherein the blocks contain six circuits, each circuit corresponding to one of the faces of the blocks.

22. An electronic toy appliance as in claim 20, further comprising a portable memory data receiving device capable of receiving data from a portable memory element, the data including information to provide a child with audio feedback responsive to the child's play with the cube-shaped blocks on the toy appliance.

23. An electronic toy appliance as in claim 22, wherein the processor utilizes data from the portable memory element to generate the output.

24. An electronic toy appliance as in claim 20, wherein the plurality of blocks have different symbols on a plurality of their faces.

25. An electronic toy appliance as in claim 20, wherein the symbols are non-alphanumeric symbols.

26. An electronic toy appliance as in claim 24, wherein the symbols are alphanumeric symbols.

27. An electronic toy appliance as in claim 20, wherein the base further includes a button that upon actuation initiates sensing of information from one or more blocks.

28. An electronic toy appliance as in claim 20, wherein the plurality of block receiving recesses are arranged in a multi-dimensional fashion.

29. An electronic toy appliance as in claim 20, wherein the processor generates a first audio output through the speaker when a first set of the blocks are in the block receiving recesses and the processor generates a second audio output through the speaker different from the first audio output when a second set of the blocks, different from the first set, in at least one respect, are in the block receiving recesses.

30. An electronic toy appliance as in claim 20, wherein the processor generates a first audio output through the speaker when a first set of blocks are in the block receiving recess and the processor generates a second audio output through the speaker different from the first audio output when a different orientation of the first set of blocks in at least one respect are in the block receiving recess.

31. An electronic toy appliance as in claim 20, wherein the processor is capable of generating an audio output via the speaker to prompt a child to select a block for placement in a block receiving recess.

32. An electronic toy appliance as in claim 20, wherein the processor is capable of generating an audio output via the speaker to prompt a child to change the orientation of a block so a different face of the block faces upwardly.

33. A portable data memory element, comprising:

one or more memory elements in a portable package containing data with information to provide a child with audio feedback responsive to a child's play with cube-shaped blocks on a toy appliance having a base with an upper surface with a plurality of block receiving recesses, each of the block receiving recesses adapted to receive a cube-shaped block having six faces and further adapted to allow a child to change the orientation of the block so different faces of the block may face upwardly, one or more sensors, the one or more sensors capable of sensing information associated with a block placed in a block receiving recess, a speaker, and a processor capable of receiving an input corresponding to the block information sensed by the one or more sensors and capable of generating, depending at least in part on the received input, an audio output via the speaker designed to stimulate the development of a child's mind.

34. An electronic toy appliance as in claim 1, wherein the processor is capable of generating an audio output via the speaker to prompt a child to place in a block receiving recess.

* * * * *